United States Patent
Schneckenburger et al.

(10) Patent No.: US 8,036,613 B2
(45) Date of Patent: Oct. 11, 2011

(54) COMMUNICATION SYSTEM AND METHOD FOR OPERATING A COMMUNICATION SYSTEM

(75) Inventors: Christian Schneckenburger, Holzkirchen (DE); Till Winteler, Munich (DE)

(73) Assignee: Infineon Technologies AG (DE)

( * ) Notice: Subject to any disclaimer, the term of this patent is extended or adjusted under 35 U.S.C. 154(b) by 654 days.

(21) Appl. No.: 11/745,352

(22) Filed: May 7, 2007

(65) Prior Publication Data
US 2008/0281994 A1 Nov. 13, 2008

(51) Int. Cl.
*H04B 1/16* (2006.01)
(52) U.S. Cl. ......... 455/208; 455/146; 455/147; 455/86; 370/395.02
(58) Field of Classification Search ............ 455/208, 455/146, 147, 86, 85, 141, 151.3, 209, 258, 455/259, 265, 318; 370/395.62, 304; 375/307, 375/359
See application file for complete search history.

(56) References Cited

U.S. PATENT DOCUMENTS

| | | | | |
|---|---|---|---|---|
| 4,097,805 A * | 6/1978 | Fujii et al. | ............ | 455/76 |
| 6,683,598 B1 * | 1/2004 | Gibson | ............ | 345/166 |
| 6,725,286 B2 * | 4/2004 | Takahashi | ............ | 710/8 |
| 6,793,144 B2 * | 9/2004 | Guez et al. | ............ | 235/492 |
| 7,079,014 B2 * | 7/2006 | Steinetz et al. | ............ | 340/392.1 |
| 7,092,375 B2 * | 8/2006 | Pitsoulakis | ............ | 370/338 |
| 7,113,491 B2 * | 9/2006 | Graziano et al. | ............ | 370/286 |
| 7,120,813 B2 * | 10/2006 | Leydier et al. | ............ | 713/400 |
| 7,241,948 B2 * | 7/2007 | Cummings | ............ | 84/731 |
| 7,350,094 B2 * | 3/2008 | Tsai et al. | ............ | 713/500 |
| 7,437,681 B2 * | 10/2008 | Misawa et al. | ............ | 715/835 |
| 7,563,977 B2 * | 7/2009 | Cummings | ............ | 84/735 |
| 7,617,408 B2 * | 11/2009 | Frazier et al. | ............ | 713/400 |
| 2002/0090043 A1 | 7/2002 | Cho | | |
| 2003/0017795 A1 | 1/2003 | Walker | | |
| 2003/0099208 A1 * | 5/2003 | Graziano et al. | ............ | 370/286 |
| 2003/0163587 A1 * | 8/2003 | Knight et al. | ............ | 709/249 |
| 2003/0167345 A1 * | 9/2003 | Knight et al. | ............ | 709/249 |
| 2003/0174795 A1 | 9/2003 | Bruhnke et al. | | |
| 2004/0127256 A1 * | 7/2004 | Goldthwaite et al. | ........ | 455/558 |
| 2004/0148539 A1 | 7/2004 | Leydier et al. | | |
| 2004/0186713 A1 * | 9/2004 | Gomas et al. | ............ | 704/235 |
| 2004/0240425 A1 * | 12/2004 | Chen et al. | ............ | 370/349 |
| 2005/0057295 A1 * | 3/2005 | Tsai et al. | ............ | 327/291 |
| 2006/0064522 A1 | 3/2006 | Weigold et al. | | |
| 2006/0196348 A1 * | 9/2006 | Cummings | ............ | 84/731 |
| 2008/0047416 A1 * | 2/2008 | Cummings | ............ | 84/731 |
| 2008/0244148 A1 * | 10/2008 | Nix et al. | ............ | 710/313 |
| 2009/0175283 A1 * | 7/2009 | Jan et al. | ............ | 370/401 |
| 2009/0222685 A1 * | 9/2009 | Foster et al. | ............ | 713/500 |
| 2009/0228224 A1 * | 9/2009 | Spanier et al. | ............ | 702/60 |
| 2009/0243570 A1 * | 10/2009 | Hulfachor et al. | ............ | 323/276 |
| 2009/0248930 A1 * | 10/2009 | Garlapati et al. | ............ | 710/106 |

* cited by examiner

*Primary Examiner* — Minh D Dao
(74) *Attorney, Agent, or Firm* — Dickstein Shapiro LLP

(57) ABSTRACT

Communication system including a host and a device. The host has an oscillator and the device has a USB-function core. The oscillator in the host is coupled to the USB-function core in the device.

24 Claims, 3 Drawing Sheets

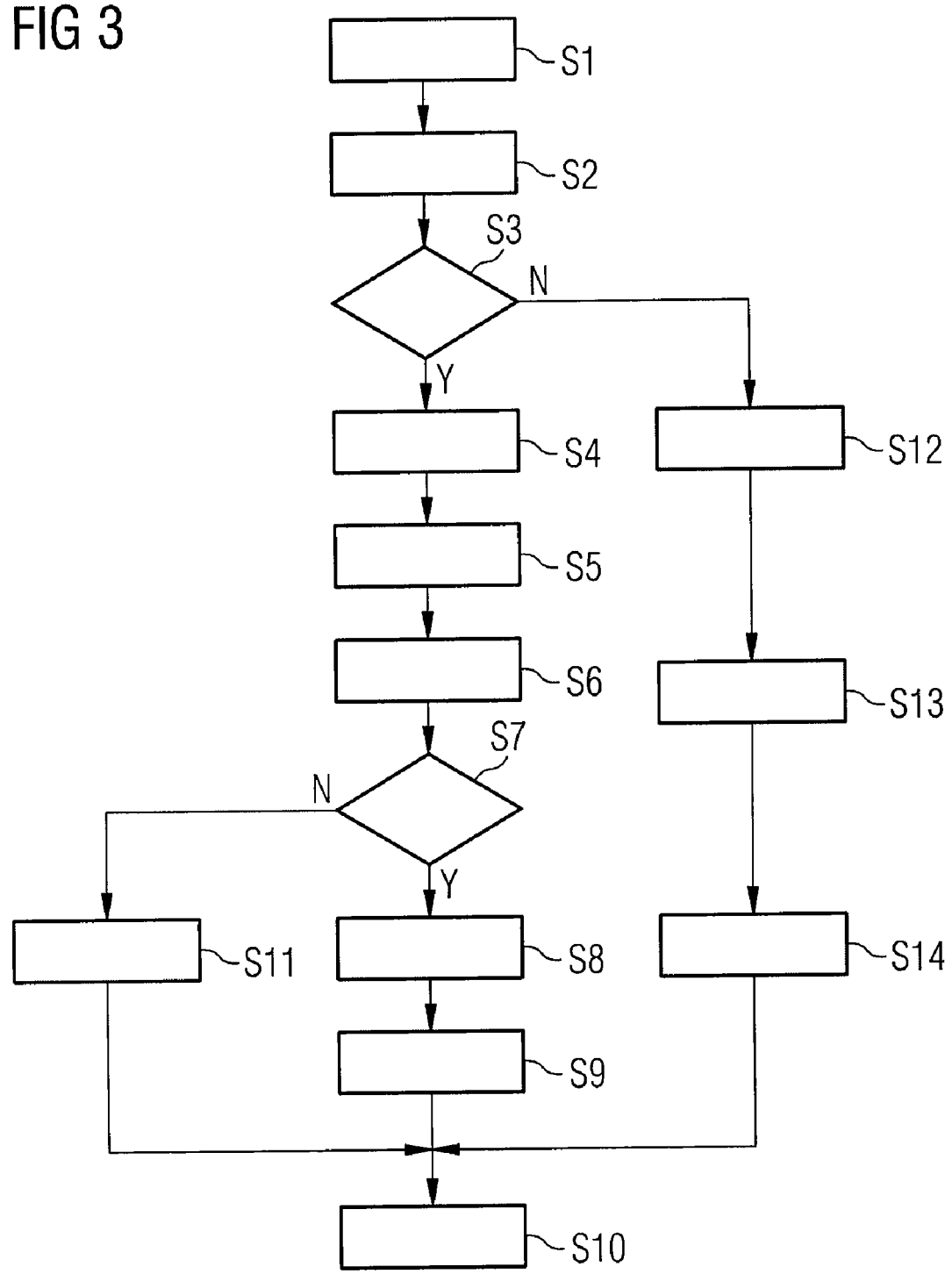

COMMUNICATION SYSTEM AND METHOD FOR OPERATING A COMMUNICATION SYSTEM

FIELD OF THE INVENTION

The invention relates to a communication system comprising a host and a device and a method for operating such a communication system.

BACKGROUND

A universal serial bus (USB) communication system comprises a host and a device which are connected by four parallel conductors carrying the supply voltage VCC, the ground GND and the data line signals D+ and D−. There is no dedicated conductor for a clock signal. Instead, a "non-return to zero invert" (NRZI) is used to encode a clock signal on the data lines D+ and D−. To decode the clock signal a USB-device requires a precise crystal quartz oscillator. However, the oscillators need to be calibrated which increases the testing time for the USB-device. Further, using such oscillators on USB-devices which offer only a small amount of space such as for example a smart card or an integrated circuit card is a challenge. In USB-devices in which an oscillator cannot be implemented due to space limitations, clock recovery circuits are used to obtain the clock signal from the transmitted data. However, to generate the required very precise clock signal out of the USB data stream requires complex circuitry with analog parts and digital parts needing digital signal processing (DSP) capabilities. Further, such clock recovery circuits have a high power consumption which is a challenge especially in battery operated applications, such as, for example, a USB-subscriber identity module (SIM)-card.

BRIEF DESCRIPTION OF THE DRAWINGS

The invention will be explained in more detail below using exemplary embodiments and with the aid of figures.

FIG. 3 shows a flow chart an operation of an embodiment of the communication system.

DETAILED DESCRIPTION OF THE INVENTION

Figure 1:
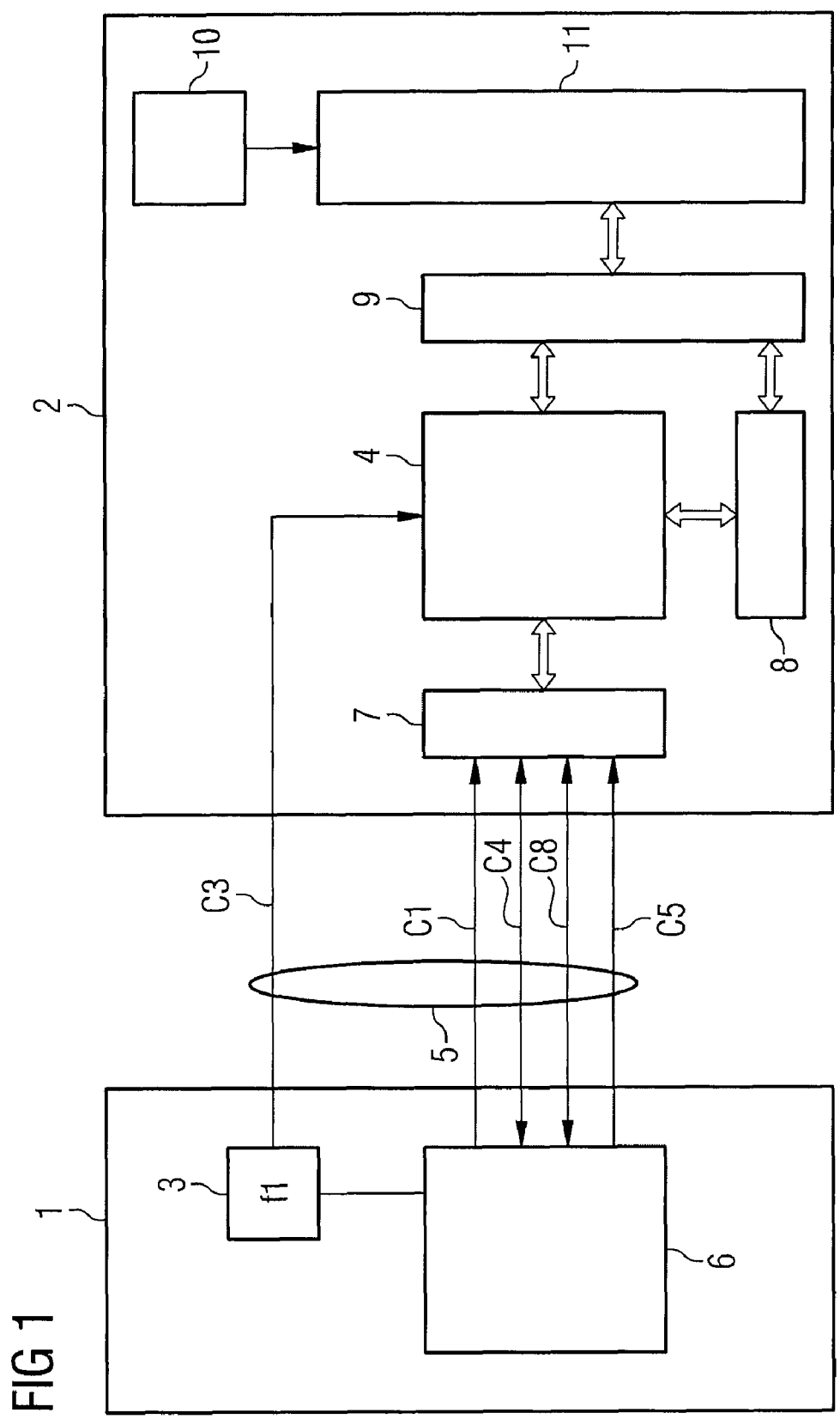
FIG. 1 shows an embodiment of a communication system.

The invention provides a communication system, comprising a host and a device. The host comprises an oscillator and the device comprises a USB-function core. The oscillator in the host is coupled to the USB-function core in the device. The device uses the oscillator in the host and therefore does not require its own oscillator or a clock recovery circuit.

In an embodiment, the host comprises a USB-communication unit which is coupled to the oscillator. The device comprises a USB-transceiver. The host USB-communication unit is connected to the device USB-transceiver by a set of contacts. The host and the device use the same clock signal of the oscillator so that their operation is synchronous. This avoids asynchronous interfaces which are present when using a separate oscillator or a clock recovery circuit on the device and which lead to higher electromagnetic interference (EMI). There is no need for complex circuitry needed for overcoming the asynchronicity.

In an embodiment, the set of contacts conform to the ISO-7816-3 standard. This standard is frequently used in integrated circuit cards (ICC) or smart cards.

In an embodiment, the oscillator is coupled using the clock (CLK) pad of the ISO-7816-3 contacts. According to the ISO-7816-3 standard, one of the eight contacts available is used for transmitting a clock signal, which is used in the embodiment for transmitting a clock signal for the USB-communication between the host and the device.

In an embodiment, the device comprises a clock recovery unit that is connected to the USB-transceiver. The clock recovery unit is provided in the device so that the device can also communicate with hosts that do not supply a common clock signal for the USB-data communication.

In an embodiment, the device comprises a clock selection unit which is connected to the oscillator, to the clock recovery unit and to the USB-function core. The clock selection unit is used to select a clock signal from either the oscillator or the clock recovery unit. The clock signal is then passed on to the USB-function core.

In an embodiment, the host comprises an ISO-7816-communication unit connected to the set of contacts. The ISO-7816-communication unit is provided so that the host can communicate with a device that only supports the ISO-7816 standard and does not support USB-communication.

In an embodiment, the oscillator provides a USB-clock signal and an ISO-7816-clock signal. The oscillator provides clock signals for both the USB-mode and the ISO-mode of operation.

In an embodiment, the host comprises a control unit for operating the USB-communication unit, the ISO-7816-communication unit in the host and the oscillator. The control unit chooses the USB-mode or the ISO-mode of communication and adjusts the oscillator to output the correct clock signal.

In an embodiment, the device comprises an ISO-7816-communication unit connected to the set of contacts. The ISO-7816-communication unit in the device is provided to supply the device with an ISO-communication mode if the host does not support a USB-communication mode.

In an embodiment, the host is a mobile phone.

In an embodiment, the device is one of a subscriber identity module (SIM) card, a universal integrated circuit card (UICC) or a removable user identity module (RUIM).

In an embodiment, the frequency of the USB-clock signal provided by the oscillator is 12 MHz. Since the device is provided with the same frequency as the host, no oversampling is necessary to obtain a precise clock signal in a clock recovery unit. The usual frequency of 48 MHz for the USB-function core can be reduced by a factor of 4 for reducing the power consumption in the device.

In an embodiment, the coupling of the oscillator to the USB-function core is wireless. This is useful if wireless-USB is used for transferring the signals necessary for standard USB-communication.

The invention further provides a method for an operating communication system according to one of the embodiments described above and comprises the steps of: the host applying signals necessary for USB-device detection, the host waiting for the device to attach as a USB-device, and the oscillator applying a USB-clock signal if the device is attached as a USB-device. If a USB-device is detected and attached to the host the device is supplied with a USB-clock signal so that the device dies not need its own oscillator or a clock recovery unit.

In an embodiment, the signals necessary for USB-device detection are applied to the set of contacts connecting the host and the device and the USB-clock signal is applied at the clock pad CLK if the device is attached as a USB-device. In this way synchronous operation between the host and the device is achieved.

In an embodiment, if the device does not attach as a USB-device, the control unit applies signals necessary for an ISO-7618-startup sequence to the set of contacts. The communication system uses the ISO-7618 standard for communication if a USB-communication mode is not supported by the device.

In an embodiment, if the device does not receive a USB-clock signal at the clock pad CLK, the clock recovery unit is used for generated a USB-clock signal for the USB-function core. If the host does not provide a USB-clock signal, the device uses a clock recovery unit.

In an embodiment, the oscillator is switched off by the host if the device is in a suspend mode. Switching off the oscillator reduces the power consumption of the communication system in a suspend or a power saving mode. Since the communication is always initiated by the host, the host can switch on the clock prior to communication. Power saving is especially of interest in battery-powered applications.

FIG. 1 shows an embodiment of a communication system comprising a host 1 and a device 2. The host 1 is connected to the device 2 by means of a set of contacts 5. The contacts C1 and C5 transmit the supply voltage VCC and the ground potential GND, respectively, while the contacts C4 and C8 transmit the signals on the data lines D+ and D−, as is prescribed by the USB-specification. In host 1, the contacts are connected to a USB-communication unit 6, while in the host 2, the contacts are connected to a USB-transceiver 7. The USB-transceiver 7 is connected to a USB-function core 4 which is used for decoding received data and for encoding data that is to be transmitted. A buffer 8 stores decoded data from the USB-function core 4 and is connected to a bus interface 9. The USB-function core 4 is also connected to the bus interface 9 in order to receive instructions. A CPU oscillator 10 and a CPU 11 are provided in the host 2 for further manipulation of the data received by the USB-transceiver 7.

An oscillator 3 in the host 1 is connected to the USB-communication unit 6 in the host 1. The oscillator 3 is further connected by means of a contact C3 to the device 2 and provides the USB-function core 4 with a USB-clock signal. The device 2 therefore does not require its own oscillator or a clock recovery circuit for decoding a clock signal from the data line signals D+ and D−. Instead, the device 2 uses the same oscillator 3 as the host 1 for USB-data communication. As a result, the device 2 is small enough to be integrated into smart cards or integrated circuit cards and does not require calibration of an oscillator to match the frequency of the oscillator in the host 1. Further, as there is no clock recovery unit it is cheaper as it has less parts and a smaller chip die size and consumes less power. Still further, the use of the same oscillator 3 in the host 1 and the device 2 leads to a synchronous operation which reduces the engineering efforts required for compensating asynchronous operation and results in lower electromagnetic interference.

As an example, the host 1 can be a mobile phone and the device 2 can be a subscriber identity module (SIM), an universal integrated circuit card (UICC) or a removable user identity module (RUIM) which are used for mobile communication in the GSM, UMTS or CDMA systems. These cards use contacts which conform to the ISO-7816-3 standard for connection with the mobile phone. The CPU 11 usually supplies functions for the mobile phone such as authentication of the subscriber. Of course, the host 1 and the device 2 are not limited to mobile communication cards using USB but can be any USB-host and any USB-device where the clock signal is separately provided by the host 1 for the device 2. An example would be the coupling of the standard USB-signals and the USB-clock between the host 1 and the device 2 by wireless means, such as is used for example by wireless-USB.

Figure 2:
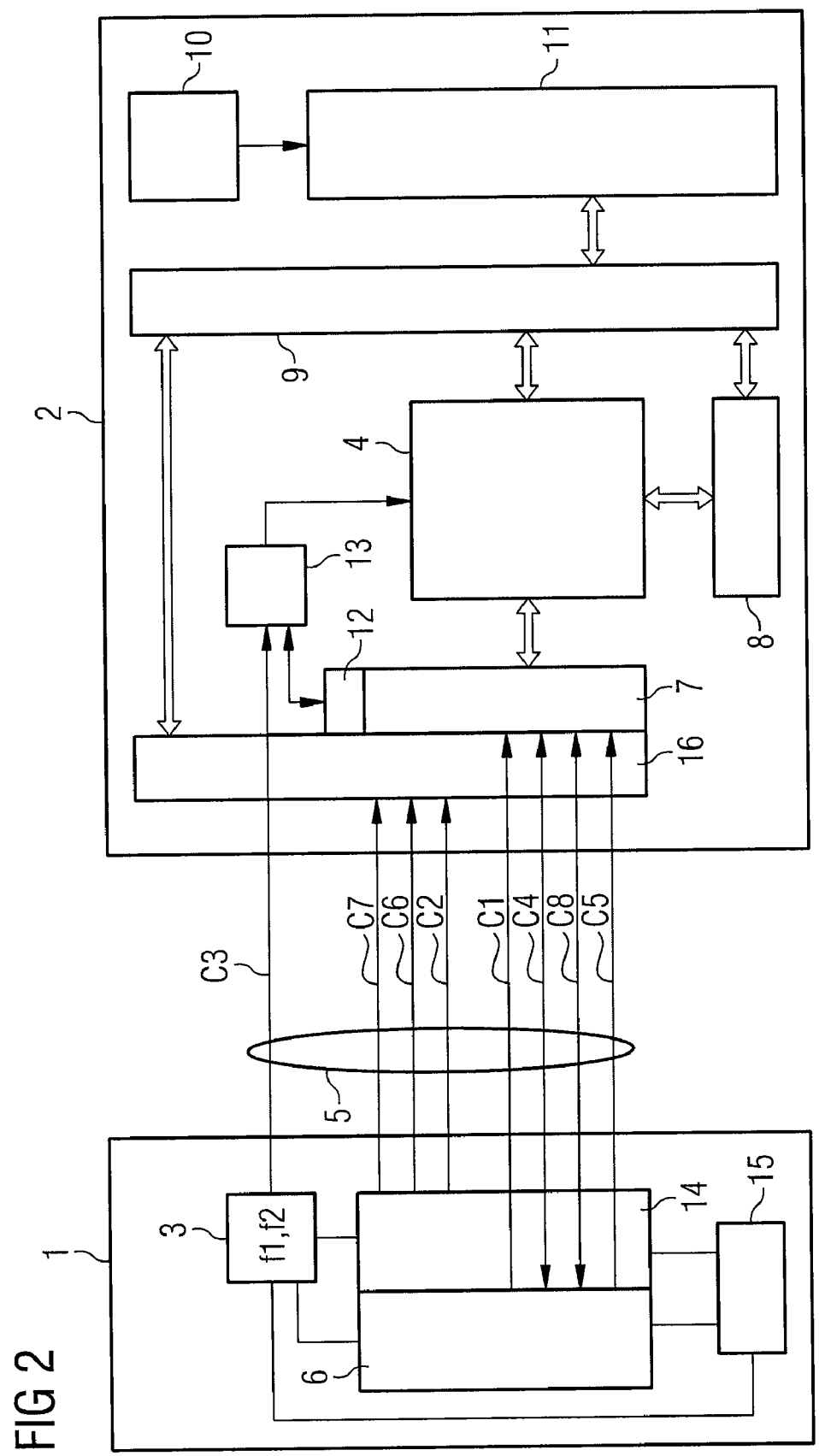
FIG. 2 shows a modified embodiment.

FIG. 2 shows an embodiment of a communication system which is similar to the one shown in FIG. 1. Host 1 further comprises an ISO-7816-communication unit 14 and a control unit 15 which is connected to the USB-communication unit 6, to the ISO-7816-communication unit 14 and to the oscillator 3. The oscillator 3 can output a USB-clock signal f1 and an ISO-7816 clock signal f2 where the output is selected by the control unit 15. The USB-clock signal f1 can be 12 MHz or 48 MHz while the ISO-7816 clock signal f2 may have a frequency of 1 to 10 MHz for smart cards or chip cards and a frequency of 10 kHz to 100 kHz for synchronous memory cards. The device 2 further comprises an ISO-7816-communication unit 16, a clock recovery unit 12, and a clock selection unit 13. The ISO-7816-communication unit 16 is connected to the bus interface 9 to allow further communication with the CPU 11. The lines representing the contacts C1, C4, C5 and C6 are shown as passing through the ISO-7816-communication units 14 and 16 indicating that the signals on these lines are available to both the ISO-7816-communication unit 14 and the USB-communication unit 16 in the host and to the ISO-7816-communication unit 16 and the USB-transceiver 7 in the device 2.

The communication system shown in FIG. 2 can operate in three different modes: an ISO-7816 communication mode, a standard USB-communication mode and a USB-communication mode in which a USB-clock signal is provided by the host 1.

In the ISO-7816 mode, the ISO-7816-communication unit 14 in device 2 and the ISO-7816-communication unit 16 in the host 1 are connected by means of the contacts C1 to C8. ISO-7816 communication signals are applied by the host 1 to the contacts C1 to C8. The oscillator 3 is set by the control unit 15 to output an ISO-7816 clock signal f2 which is transferred to the device 2 using the clock contact C3.

Since the ISO-mode of communication only allows low data transmission rates, the host 1 and the device 2 also support a faster USB-mode in which data and power are transferred between the host 1 and the device 2 by means of the contacts C1, C4, C5 and C6. In a standard USB-mode a clock signal is extracted from the data signals D+ and D− on the contacts C4 and C8 in the clock recovery circuit 12. The standard USB-mode is used if no USB-clock signal f1 can be detected in the clock selection unit 13. The output of the clock recovery circuit 12 is passed through the clock selection unit 13 on to the USB-function core 4.

In a USB-mode with a clock signal from the host 1, the oscillator 3 is set by the control unit 15 to output a USB-clock signal f1 which is transmitted to the host 2 by means of the contact C3 which is used in the ISO-7816-mode as the clock pad CLK. The clock selection unit 13 detects a USB-clock signal f1 at contact C3 and passes the USB-clock signal f1 on to the USB-function core 4. In this mode the clock recovery unit 12 can be deactivated and the USB-host 1 and the USB-device 2 are synchronized. The advantages and modification described in conjunction with FIG. 1 also apply to the embodiment shown in FIG. 2.

The communication system shown in FIG. 2 shows a host 1 that can communicate with a device 2 that supports ISO-7816 communication, standard USB-communication and USB-communication with a USB-clock signal f1 provided by the host 1. Similarly, the device 2 can be used with a terminal supporting ISO-7816 communication, standard USB-communication and USB-communication with a USB-clock signal f1 provided by the host 1. Communication systems in which not all modes are supported by both the host 1 and the device 2 are also possible. In such communication systems the components shown in FIG. 2 can be simplified if the modes supported by the host 1 and the device 2 are known beforehand, resulting for example in the configuration shown in FIG. 1.

FIG. 3 shows a flow chart illustrating a possible operation of the embodiment of the communication system shown in FIG. 2.

In step S1, the communication system starts up for communication between the host 1 and the device 2. The host 1 and the device 2 are at least connected by means of the contacts C1, C4, C5 and C8.

In step S2, the host 1 applied USB-signals to the contacts C1, C4, C5 and C8.

In the query S3, it is determined if the device 2 can support a USB-communication mode. In case that the device 2 supports USB-communication, the flow moves on to step S4.

In step S4, the device 2 responds to the USB-signals of the host 1.

In step S5, the host 1 waits for the device 2 to attach itself as a USB-device for further communication.

In step S6, the device 2 attaches itself to the USB-bus.

In the query S7, it is determined if the device 2 can use an external USB-clock signal f1 applied to a further contact C3 connecting the host 1 and the device 2. If the device 2 can use an external USB-clock signal f1, the flow continues with step S8.

In step S8, the host 1 applies a USB-clock signal to contact C3.

In step S9, the device 2 uses the USB-clock signal for further encoding and decoding in the USB-function core 4. The communication system operates in the USB-communication mode with a USB-clock signal f1 provided by the host 1.

If in the query S7, it is decided that the device 2 cannot use a USB-clock signal, the flow continues with step S11.

In step S11, a clock signal is extracted from the data D+ and D– transmitted by the contacts C4 and C8 by means of the clock recovery unit 12. The recovered clock signal is passed on to the USB-function core 4 and the communication system operates in a standard USB-communication mode.

If in the query S3, it is decided that the device 2 does not support a USB-communication, the flow continues with step S12.

In step S12, the host 1 sees no USB-device 2 attached.

In step S13, the host 1, therefore, performs an ISO-7816-startup sequence and applies the corresponding signals to the lines C1 to C8, providing an ISO-7816-clock signal f2 at the clock signal pad C3.

In step S14, the device recognizes the ISO-7816-startup sequence and answers with an answer to reset (ATR). The communication system operates in the ISO-7816-communication mode.

In all three modes of operation, the final step shown is step S10 in which further communication between the host 1 and the device 2 is carried out.

The flow shown in FIG. 3 can be modified to take into account the configurations of the host 1 and the device 2. Parts may be deleted if certain modes are not supported and parts may be added if further modes are supported.

What is claimed is:

1. A communication system, comprising:
    a host comprising an oscillator; and
    a device comprising a USB-function core,
    wherein the oscillator in the host is coupled directly to the USB-function core in the device such that the device can use the oscillator of the host and not require its own oscillator or clock recovery unit.

2. The communication system of claim 1, wherein
    the host comprises a USB-communication unit which is coupled to the oscillator,
    the device comprises a USB-transceiver, and
    the host USB-communication unit is connected to the device USB-transceiver by a set of contacts.

3. The communication system of claim 2, wherein the set of contacts conforms to the ISO-7816-3 standard.

4. The communication system of claim 3, wherein the oscillator is coupled using the clock pad of the ISO-7816-3 contacts.

5. The communication system of claim 3, wherein the device comprises an ISO-7816-communication unit connected to the set of contacts.

6. The communication system of claim 2, wherein the device comprises a clock recovery unit which is connected to the USB-transceiver.

7. The communication system of claim 6, wherein the device comprises a clock selection unit which is connected to the oscillator, to the clock recovery unit and to the USB-function core.

8. The communication system of claim 2, wherein the host comprises an ISO-7816-communication unit connected to the set of contacts.

9. The communication system of claim 8, wherein the oscillator provides a USB-clock signal and an ISO-7816-clock signal.

10. The communication system of claim 9, wherein the host comprises a USB-communication unit which is coupled to the oscillator, and a control unit configured to operate the USB-communication unit, the host ISO-7816-communication unit and the oscillator.

11. The communication system of claim 2, wherein the device further comprises a CPU oscillator and a CPU which are configured to manipulate data received from the USB-transceiver.

12. The communication system of claim 1, wherein the host is a mobile phone.

13. The communication system of claim 12, wherein the device is one of a Subscriber Identity Module card, a Universal Integrated Circuit Card and a Removable User Identity Module.

14. The communication system of claim 13, wherein the frequency of the USB-clock signal provided by the oscillator is 12 MHz.

15. The communication system of claim 1, wherein the coupling of the oscillator to the USB-function core is wireless.

16. The communication system of claim 1, wherein the device further comprises a buffer configured to store decoded data from the USB-function core.

17. The communication system of claim 1, wherein the device further comprises:
    a CPU; and
    a bus interface configured to transmit instructions from the CPU to the USB-function core.

18. A method for operating a communication system according to claim 1, comprising:
    the host applying signals necessary for USB-device detection to contacts connecting the host and device;
    the host waiting for the device to attach as a USB-device; and
    the oscillator applying a USB-clock signal if the device is attached as a USB-device.

19. The method of claim 18, further comprising:

applying the signals necessary for USB-device detection to a set of contacts connecting the host and the device, and applying the USB-clock signal at the clock pad if the device is attached as a USB-device.

20. The method of claim 19, wherein if the device does not attach as a USB-device, further comprising the control unit applying signals necessary for an ISO-7618-startup sequence to the set of contacts.

21. The method of claim 18, wherein if the device does not receive a USB-clock signal at the clock pad, further comprising the clock recovery unit generating a USB-clock signal for the USB-function core.

22. The method of claim 18, further comprising the host switching the oscillator off if the device is in a suspend mode.

23. A communication system, comprising:
a device comprising a USB-function core;
a host comprising:
   a USB communication unit; and
   an oscillator coupled directly to the USB-function core in the device and configured to provide both the USB-function core and the USB communication unit with a USB clock signal such that the device does not require its own oscillator or clock recovery unit.

24. A communication system, comprising:
a device comprising a USB-function core;
a host comprising an oscillator,
wherein the oscillator in the host is coupled directly to the USB-function core in the device, and both the device and the host use the oscillator for USB-data communication such that the device does not require its own oscillator or clock recovery unit.

* * * * *